United States Patent
Zhang (10) Patent No.: US 12,321,606 B2
(45) Date of Patent: Jun. 3, 2025

(54) METHOD FOR PERFORMING MEMORY OPERATION AND APPARATUS

(71) Applicant: Huawei Technologies Co., Ltd., Shenzhen (CN)

(72) Inventor: Bin Zhang, Hangzhou (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 18/468,387

(22) Filed: Sep. 15, 2023

(65) Prior Publication Data

US 2024/0004552 A1   Jan. 4, 2024

Related U.S. Application Data

(63) Continuation of application No. PCT/CN2021/081566, filed on Mar. 18, 2021.

(51) Int. Cl.
G06F 3/06   (2006.01)

(52) U.S. Cl.
CPC .......... G06F 3/0613 (2013.01); G06F 3/0659 (2013.01); G06F 3/0673 (2013.01)

(58) Field of Classification Search
CPC .... G06F 3/0613; G06F 3/0659; G06F 3/0673; G06F 3/0661; G06F 3/0679; G06F 3/0658
USPC .................................................. 711/154, 100
See application file for complete search history.

(56) References Cited

U.S. PATENT DOCUMENTS 11,275,527 B1* 3/2022 Spector ............... G06F 13/1642
2017/0192902 A1 7/2017 Hwang et al.
2019/0034364 A1* 1/2019 Lee .................... G06F 13/1673

FOREIGN PATENT DOCUMENTS

JP   2008210226 A   9/2008
WO  2020024151 A1   2/2020

OTHER PUBLICATIONS

HeeChang Cho et al:"HPB v2.0 supporting Larger than 4KB read", Universal Flash Storage (UFS) Host Performance Booster(HPB) Extension, JEDEC Standard, JESD220-3, Mar. 19, 2020, total 39 pages.
"#139.34, Why HPB v2.0 is needed, not HPB v1.1 only. (performance measured in real smartphone)", (Apr. 2, 2020), Samsung, total 3 pages.
"Universal Flash Storage (UFS) Version 3.1",JEDEC Standard, Jan. 2020, total 421 pages.
"User Guide SD_eMMC Device",Mar. 2014, total 332 pages.

* cited by examiner

*Primary Examiner* — Hosain T Alam
*Assistant Examiner* — Zubair Ahmed
(74) *Attorney, Agent, or Firm* — Slater Matsil, LLP (57) ABSTRACT

A method for performing a memory operation and an apparatus are provided. The method for performing a memory operation includes: generating an operation command, where the operation command includes a universal flash storage protocol information unit UPIU frame header and an extension header segment EHS, where the EHS frame header includes a total length field of the EHS, the total length field of the EHS indicates that a length of the EHS is not 0, and the EHS indicates storage addresses respectively corresponding to a plurality of EHS operation commands; and sending the operation command to a universal flash storage UFS device controller.

24 Claims, 5 Drawing Sheets

| UPIU frame header ||||
|---|---|---|---|
| 0<br>xx00 0001b | 1<br>Flags | 2<br>LUN | 3<br>Task tag |
| 4<br>IID / Command set type | 5<br>Reserved | 6<br>Reserved | 7<br>Reserved |
| 8<br>Total EHS length | 9<br>Total EHS Num | 10 (MSB)<br>Data segment length | 11 (LSB) |
| 12 (MSB) | 13 | 14 | 15 (LSB) |
| Expected data transfer length ||||
| 16<br>CDB [0] | 17<br>CDB [1] | 18<br>CDB [2] | 19<br>CDB [3] |
| 20<br>CDB [4] | 21<br>CDB [5] | 22<br>CDB [6] | 23<br>CDB [7] |
| 24<br>CDB [8] | 25<br>CDB [9] | 26<br>CDB [10] | 27<br>CDB [11] |
| 28<br>CDB [12] | 29<br>CDB [13] | 30<br>CDB [14] | 31<br>CDB [15] |
| Header E2ECRC ||||

| | | 0 | 1 | 2 | 3 |
|---|---|---|---|---|---|
| EHS | 0 | LBA 0 ||||
| | 4 | LEN 0 ||||
| | 8 | LBA 1 ||||
| | 12 | LEN 1 ||||
| | 16 | LBA 2 ||||
| | 20 | LEN 2 ||||
| | 24 | LBA 3 ||||
| | 28 | LEN 3 ||||

FIG. 4

| UPIU frame header | | | | | | |
|---|---|---|---|---|---|---|
| 0 xx00 0001b | | 1 Flags | 2 LUN | | 3 Task tag | |
| 4 IID | Command set type | 5 Reserved | 6 Reserved | | 7 Reserved | |
| 8 Total EHS length | | 9 Reserved | 10 (MSB) Data segment length | | 11 (LSB) | |
| 12 (MSB) | | 13 | 14 | | 15 (LSB) | |
| Expected data transfer length | | | | | | |
| 16 CDB [0] | | 17 CDB [1] | 18 LBA [3] CDB [2] | | 19 LBA [2] CDB [3] | |
| 20 LBA [1] CDB [4] | | 21 LBA [0] CDB [5] | 22 CDB [6] | | 23 CDB [7] | |
| 24 CDB [8] | | 25 CDB [9] | 26 Length [3] CDB [10] | | 27 Length [2] CDB [11] | |
| 28 Length [1] CDB [12] | | 29 Length [0] CDB [13] | 30 CDB [14] | | 31 CDB [15] | |
| EHS | | | | | | |
| 0 (MSB) PPN 0[3] | | 1 PPN 0[2] | 2 PPN 0[1] | | 3 (LSB) PPN 0[0] | |
| 4 (MSB) PPN 1[3] | | 5 PPN 1[2] | 6 PPN 1[1] | | 7 (LSB) PPN 1[0] | |
| 8 (MSB) PPN 2[3] | | 9 PPN 2[2] | 10 PPN 2[1] | | 11 (LSB) PPN 2[0] | |
| 12 (MSB) PPN 3[3] | | 13 PPN 3[2] | 14 PPN 3[1] | | 15 (LSB) PPN 3[0] | |

METHOD FOR PERFORMING MEMORY OPERATION AND APPARATUS

CROSS-REFERENCE TO RELATED APPLICATIONS

This application is a continuation of International Application No. PCT/CN2021/081566, filed on Mar. 18, 2021, the disclosure of which is hereby incorporated by reference in its entirety.

TECHNICAL FIELD

This application relates to storage technologies, and in particular, to a method for performing a memory operation and an apparatus.

BACKGROUND

In a universal flash storage (UFS) technology, data and information transmission is implemented between a UFS host controller and a UFS device controller through command interaction. In a current UFS protocol information unit (UPIU), because a defined length of a command is limited, the command can carry a small amount of information. If a function operation to be completed is complex, performance advantages of the UFS technology cannot be fully utilized.

A related technology provides an accelerating read command that can support 4K data. The command can trigger the UFS device controller to perform continuous accelerating read and return data at a time. However, for a storage operation of a large amount of data, this technology still requires a plurality of command interactions. This increases command interaction overheads. However, the performance advantages of the UFS technology cannot be embodied.

SUMMARY

This application provides a method for performing a memory operation and an apparatus, to reduce command interactions, reduce overall command overheads, and improve memory operation efficiency.

According to a first aspect, this application provides a method for performing a memory operation, including: A UFS host controller generates an operation command. The operation command includes a universal flash storage protocol information unit UPIU frame header and an extension header segment. A length of the UPIU frame header is a first length (32 B). A total length of the EHS is N KB–32 B. The total length is greater than a difference between 4 KB and the first length. The EHS indicates storage addresses respectively corresponding to a plurality of EHS operation commands. The UFS host controller sends the operation command to a UFS device controller. The UFS device controller determines, based on the operation command, the storage addresses respectively corresponding to the plurality of EHS operation commands, and perform corresponding memory operations at the storage addresses respectively corresponding to the plurality of EHS operation commands. The UFS device controller returns a processing result to the UFS host controller.

In a related technology, the UFS host controller detects a command transmitted between the UFS host controller and the UFS device controller. When a length of the command exceeds a specified length (for example, 4 KB), the UFS host controller performs corresponding logic control to truncate the command, and only a 4 KB command is reserved for transmission to the UFS device controller. A remaining part may be transmitted in a next command or directly discarded. The UFS device controller can also generate a 4 KB command or data by performing a same method. However, in this application, the specified length is extended, so that the UFS host controller and the UFS device controller can support transmission of an N KB command or data, where N is greater than 4, 32 B of the N KB is used for the UPIU frame header, and a remaining length (N KB–32 B) may be used for an extension header segment (EHS). The EHS with a length of N KB–32 B is not available in the related technology. Therefore, the command transmitted between the UFS host controller and the UFS device controller can carry more information. Correspondingly, the UPIU frame header includes a total length field of the EHS, and the total length field of the EHS indicates that a length of the EHS is not 0.

As described above, the operation command in this application includes the UPIU frame header and the EHS, and a total length of the command is N KB (N>4). The length of the UPIU frame header is the first length (32 B), and the total length of the EHS is N KB–32 B. In this way, compared with an operation command in the current technology, the operation command in this application can carry more information. Based on this, when the plurality of EHS operation commands need to be executed, the UFS host controller may send the plurality of EHS operation commands to the UFS device controller through one operation command.

The UPIU frame header includes the total length field of the EHS. The total length field of the EHS indicates that the length of the EHS is not 0, and the EHS indicates the storage addresses respectively corresponding to plurality of EHS operation commands. The plurality of EHS operation commands may indicate a plurality of read operations, a plurality of write operations, or a plurality of erase operations, that is, the plurality of EHS operation commands, which are all read operations, all write operations, or all erase operations, may be sent to the UFS device controller at a time through one operation command.

A maximum length of the EHS may be N KB–32 B, that is, the total length of the EHS is less than or equal to N KB–32 B. A specific value of the total length can be determined based on a length of data actually written into the EHS. A storage address corresponding to any one of the plurality of EHS operation commands may be represented in a manner of a head address with a data length. For example, a memory operation is a read operation, a head address corresponding to the read operation is a head address of to-be-read data in a storage area in the memory, and a data length is a length of to-be-read data starting from the head address.

The UFS host controller obtains the storage addresses respectively corresponding to the plurality of EHS operation commands. The operation commands sent to the UFS device controller may carry related information to indicate the storage addresses respectively corresponding to the plurality of EHS operation commands.

After receiving the operation command, the UFS device controller can extract information from corresponding bytes based on a format of the operation command, including the number of the plurality of EHS operation commands, the total length of the EHS, and the storage addresses and the data lengths respectively corresponding to the plurality of EHS operation commands.

The UFS device controller performs a corresponding operation on a plurality of storage areas determined in the foregoing steps, based on an operation type indicated in an operation instruction, for example, a read operation, a write operation, or an erase operation. When the memory operation is the read operation, the UFS device controller obtains stored data from a plurality of indicated storage areas. When the memory operation is the write operation, the UFS device controller writes data sent by the UFS host controller in the plurality of indicated storage areas. When the memory operation is the erase operation, the UFS device controller erases data from the plurality of indicated storage areas.

When the memory operation is the read operation, the UFS device controller returns read data to the UFS host controller. When the memory operation is the write operation, the UFS device controller returns a write success response to the UFS host controller. When the memory operation is the erase operation, the UFS device controller returns an erase success response to the UFS host controller.

It should be noted that, in addition to the foregoing fields, the operation command in this application may also include other fields. For example, the UPIU frame header also includes an index field (xx00 0001b) and a flag field (Flags) of the operation command. These fields may follow related stipulations in a protocol. This is not specifically limited in this application.

In this application, based on an extended operation command, one operation command can carry the storage addresses and the data lengths respectively corresponding to the plurality of EHS operation commands, and only a few command interactions are required to request to perform memory operations for a plurality of addresses, thereby reducing command interactions. In addition, because the UFS host controller and the UFS device controller can support a larger amount of data to be transmitted, when the UFS device controller receives or returns data again, more data may be carried in one command. Therefore, return commands are also reduced, and overall command overheads are reduced. During performing of a memory operation, each command needs to be scheduled by a block layer, and transmitted by a driver layer and a physical layer. After the method in this application is used, IO aggregation can be implemented for a plurality of EHS operation commands, and corresponding processing such as scheduling and transmission can be combined, thereby further reducing a processing procedure of a memory operation and improving memory operation efficiency.

In a possible implementation, the UPIU frame header further includes a number of the plurality of EHS operation commands. The EHS includes head addresses and data lengths of logical block addresses (LBAs) that are respectively corresponding to the plurality of EHS operation commands. That is, the EHS includes a plurality of LBAs, and each LBA corresponds to a data length.

In a possible implementation, the UPIU frame header further includes head logical block addresses and total data lengths that are corresponding to the plurality of EHS operation commands. The EHS includes physical page numbers (physical page numbers, PPNs) respectively corresponding to the plurality of EHS operation commands.

According to a second aspect, this application provides a UFS host controller, including a processor and an interface circuit. The processor is configured to generate an operation command, and the operation command includes a universal flash storage protocol information unit UPIU frame header and an extension header segment EHS. The UPIU frame header includes a total length field of the EHS, the total length field of the EHS indicates that a length of the EHS is not 0, and the EHS indicates storage addresses respectively corresponding to a plurality of EHS operation commands. The interface circuit is configured to send the operation command to a universal flash storage UFS device controller.

In a possible implementation, the UPIU frame header includes a number of the plurality of EHS operation commands.

In a possible implementation, the UPIU frame header includes head logical block addresses and total data lengths that are corresponding to the plurality of EHS operation commands.

In a possible implementation, the plurality of EHS operation commands indicate a plurality of read operations, a plurality of write operations, or a plurality of erase operations. The storage addresses respectively corresponding to the plurality of EHS operation commands are consecutive or inconsecutive.

In a possible implementation, the EHS includes head logical block addresses and data lengths that are respectively corresponding to the plurality of EHS operation commands.

In a possible implementation, the plurality of EHS operation commands indicate a plurality of read operations, and the storage addresses respectively corresponding to the plurality of EHS operation commands are consecutive.

In a possible implementation, the EHS includes physical page numbers respectively corresponding to the plurality of EHS operation commands.

According to a third aspect, this application provides a UFS device, including a processor, an interface circuit, and a storage medium. The interface circuit is configured to receive an operation command from a universal flash storage UFS host controller, and the operation command includes a universal flash storage protocol information unit UPIU frame header and an extension header segment EHS. The UPIU frame header includes a total length field of the EHS, the total length field of the EHS indicates that a length of the EHS is not 0, and the EHS indicates storage addresses respectively corresponding to a plurality of EHS operation commands. The processor is configured to determine, based on the operation command, the storage addresses respectively corresponding to the plurality of EHS operation commands, and perform corresponding memory operations on storage media at the storage addresses that are respectively corresponding to the plurality of EHS operation commands.

In a possible implementation, the UPIU frame header includes a number of the plurality of EHS operation commands.

In a possible implementation, the UPIU frame header includes head logical block addresses and total data lengths that are corresponding to the plurality of EHS operation commands.

In a possible implementation, the plurality of EHS operation commands indicate a plurality of read operations, a plurality of write operations, or a plurality of erase operations. The storage addresses respectively corresponding to the plurality of EHS operation commands are consecutive or inconsecutive.

In a possible implementation, the EHS includes head logical block addresses and data lengths that are respectively corresponding to the plurality of EHS operation commands.

In a possible implementation, the plurality of EHS operation commands indicate a plurality of read operations, and the storage addresses respectively corresponding to the plurality of EHS operation commands are consecutive.

In a possible implementation, the EHS includes physical page numbers respectively corresponding to the plurality of EHS operation commands.

According to a fourth aspect, this application provides a UFS host control apparatus, including a processing module and a sending module. The processing module is configured to generate an operation command, and the operation command includes a universal flash storage protocol information unit UPIU frame header and an extension header segment EHS. The UPIU frame header includes a total length field of the EHS, the total length field of the EHS indicates that a length of the EHS is not 0, and the EHS indicates storage addresses respectively corresponding to a plurality of EHS operation commands. The sending module is configured to send the operation command to a universal flash storage UFS device controller.

In a possible implementation, the UPIU frame header includes a number of the plurality of EHS operation commands.

In a possible implementation, the UPIU frame header includes head logical block addresses and total data lengths that are corresponding to the plurality of EHS operation commands.

In a possible implementation, the plurality of EHS operation commands indicate a plurality of read operations, a plurality of write operations, or a plurality of erase operations. The storage addresses respectively corresponding to the plurality of EHS operation commands are consecutive or inconsecutive.

In a possible implementation, the EHS includes head logical block addresses and data lengths that are respectively corresponding to the plurality of EHS operation commands.

In a possible implementation, the plurality of EHS operation commands indicate a plurality of read operations, and the storage addresses respectively corresponding to the plurality of EHS operation commands are consecutive.

In a possible implementation, the EHS includes physical page numbers respectively corresponding to the plurality of EHS operation commands.

According to a fifth aspect, this application provides a UFS apparatus, including a receiving module and a processing module. The receiving module is configured to receive an operation command from a universal flash storage UFS host controller, and the operation command includes a universal flash storage protocol information unit UPIU frame header and an extension header segment EHS. The UPIU frame header includes a total length field of the EHS, the total length field of the EHS indicates that a length of the EHS is not 0, and the EHS indicates storage addresses respectively corresponding to a plurality of EHS operation commands. The processing module is configured to determine, based on the operation command, the storage addresses respectively corresponding to the plurality of EHS operation commands, and perform corresponding memory operations on storage media at the storage addresses respectively corresponding to the plurality of EHS operation commands.

In a possible implementation, the UPIU frame header includes a number of the plurality of EHS operation commands.

In a possible implementation, the UPIU frame header includes head logical block addresses and total data lengths that are corresponding to the plurality of EHS operation commands.

In a possible implementation, the plurality of EHS operation commands indicate a plurality of read operations, a plurality of write operations, or a plurality of erase operations. The storage addresses respectively corresponding to the plurality of EHS operation commands are consecutive or inconsecutive.

In a possible implementation, the EHS includes head logical block addresses and data lengths that are respectively corresponding to the plurality of EHS operation commands.

In a possible implementation, the plurality of EHS operation commands indicate a plurality of read operations, and the storage addresses respectively corresponding to the plurality of EHS operation commands are consecutive.

In a possible implementation, the EHS includes physical page numbers respectively corresponding to the plurality of EHS operation commands.

According to a sixth aspect, this application provides a computer-readable storage medium, including a computer program. When the computer program is executed on a computer, the computer is enabled to perform the method according to any implementation of the first aspect.

DETAILED DESCRIPTION OF ILLUSTRATIVE EMBODIMENTS

To make the objectives, technical solutions, and advantages of this application clearer, the following clearly and completely describes the technical solutions of this application with reference to the accompanying drawings in this application. It is clear that described embodiments are merely a part rather than all of embodiments of this application. All other embodiments obtained by a person of ordinary skill in the art based on embodiments of this application without creative efforts shall fall within the protection scope of this application.

In this specification, embodiments, claims, and accompanying drawings of this application, terms "first", "second", and the like are merely intended for distinguishing and description, and shall not be understood as an indication or implication of relative importance or an indication or implication of an order. In addition, terms "include", "have", and any variant thereof are intended to cover non-exclusive inclusion, for example, include a series of steps or units. Methods, systems, products, or devices are not necessarily limited to those steps or units that are literally listed, but may include other steps or units that are not literally listed or that are inherent to such processes, methods, products, or devices.

It should be understood that in this application, "at least one" means one or more and "a plurality of" means two or more. The term "and/or" is used for describing an association relationship between associated objects, and represents that three relationships may exist. For example, "A and/or B" may represent the following three cases: Only A exists, only B exists, and both A and B exist, where A and B may be singular or plural. The character "/" generally indicates an "or" relationship between the associated objects. "At least one of the following" or a similar expression thereof indicates any combination of the following, including any combination of one or more of the following. For example, at least one of a, b, or c may indicate a, b, c, a and b, a and c, b and c, or a, b, and c, where a, b, and c may be singular or plural.

Figure 1:
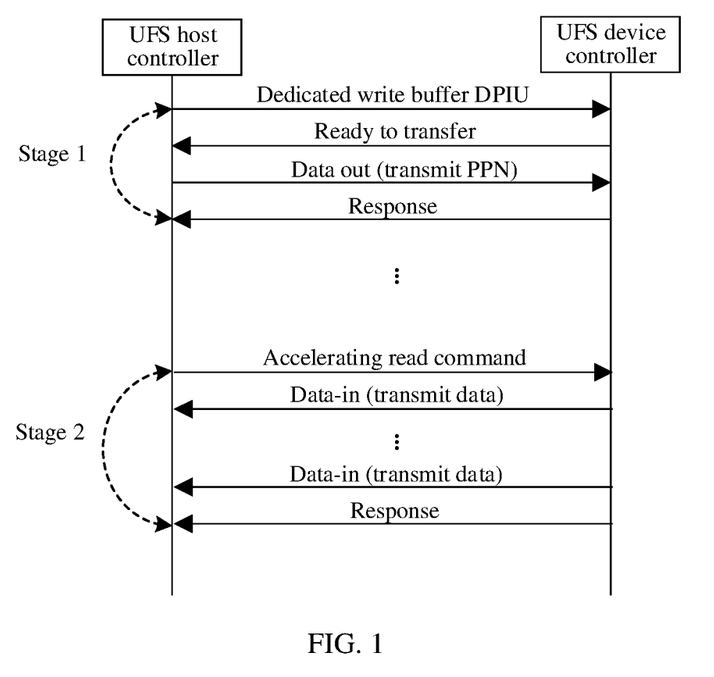
FIG. 1 is a flowchart of an example of accelerating read in a related technology.

FIG. 1 is a flowchart of an example of accelerating read in a related technology. As shown in FIG. 1, in a stage 1, when finding that a large range of IO reads all hit an entry, a UFS host controller sends a dedicated Write Buffer DPIU, Ready to transfer, and Data out command sequence, and sends a read operation command of a plurality of physical page numbers (PPNs). In a stage 2, the UFS host controller sends an accelerating read command, to trigger the UFS device controller to perform continuous accelerating read and return data at a time.

However, completing the foregoing accelerating read operation requires two stages, and at least eight UPIU command interactions are performed in total. If a function operation to be completed is relatively complex, a performance advantage of a UFS technology cannot be fully utilized. Particularly the command interaction is concurrent command interaction of a plurality of slots, and a command ownership mark needs to be separately added to the UFS host controller and the UFS device controller to avoid complex processing and high overheads of command interaction caused by command disorder.

To resolve the foregoing technical problem, this application provides a method for performing a memory operation. The method is described with the following embodiments.

Figure 2:
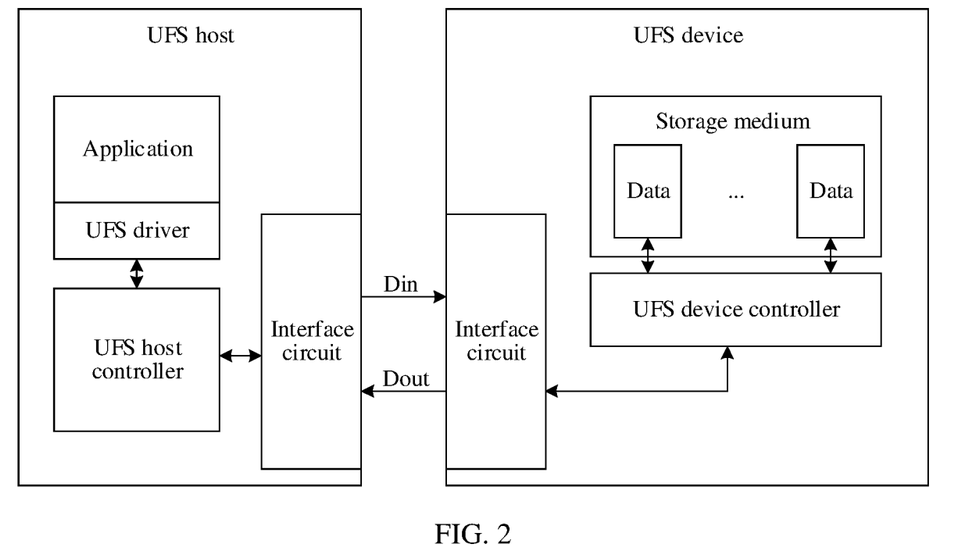
FIG. 2 is a diagram of a structure of an example of a hardware system according to this application.

FIG. 2 is a diagram of a structure of an example of a hardware system according to this application. As shown in FIG. 2, a UFS host includes an application, a UFS driver, a UFS host controller, and an interface circuit. A UFS device includes a storage medium (user storage), a UFS device controller, and an interface circuit.

Commands and data between the UFS host and the UFS device are transmitted through the interface circuits of the UFS host and the UFS device. The UFS host controller is responsible for generating an operation command, and the UFS device controller is responsible for parsing a command and controlling execution of a memory operation.

Based on the foregoing structure, in a related technology, the UFS host controller detects a command transmitted between the UFS host controller and the UFS device controller. When a length of the command exceeds a specified length (for example, 4 KB), the UFS host controller performs corresponding logical control to truncate the command, and only a 4 KB command is reserved for transmission to the UFS device controller. A remaining part may be transmitted in a next command or directly discarded. The UFS device controller can also generate a 4 KB command or data by performing a same method. However, in this application, the specified length is extended, so that the UFS host controller and the UFS device controller can support transmission of an N KB command or data, where N is greater than 4, 32 B of the N KB is used for the UPIU frame header (Frame Header), and a remaining length (N KB−32 B) may be used for an extension header segment (EHS). The EHS with a length of N KB−32 B is not available in the related technology. Therefore, the command transmitted between the UFS host controller and the UFS device controller can carry more information. Correspondingly, the UPIU frame header includes a total length field of the EHS, and the total length field of the EHS indicates that a length of the EHS is not 0.

It should be noted that the UFS host and the UFS device in this application may be integrated into a same electronic device to jointly complete a memory operation, and the electronic device has a storage capability. Alternatively, the UFS host and the UFS device may be separately disposed on different electronic devices. For example, the UFS host is disposed on a user equipment such as a mobile phone or a tablet computer, and the UFS device is disposed on a memory such as a hard disk, a register, or a flash memory.

Figure 3:
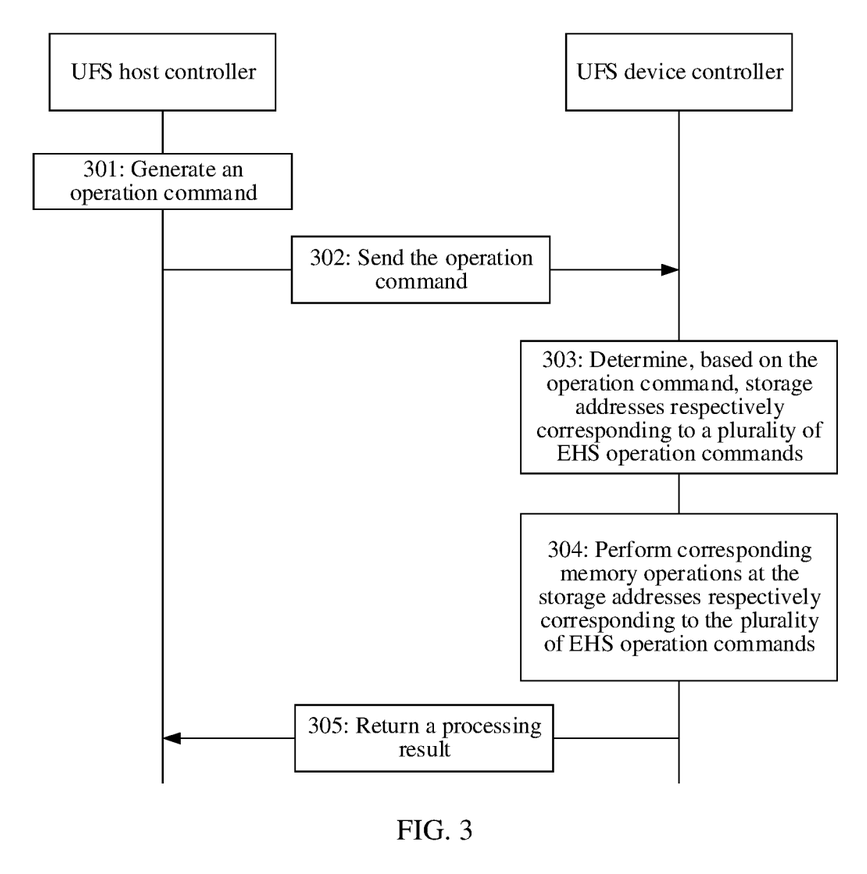
FIG. 3 is a flowchart of an example of a method for performing a memory operation according to this application.

FIG. 3 is a flowchart of an example of a method for performing a memory operation according to this application. As shown in FIG. 3, the method in this embodiment may be jointly performed by the foregoing UFS host controller and UFS device controller. The method for performing a memory operation may include the following steps.

Step 301: The UFS host controller generates an operation command.

As described above, the operation command in this application includes the UPIU frame header and the EHS, and a total length of the command is N KB (N>4). The length of the UPIU frame header is the first length (32 B), and the total length of the EHS is N KB−32 B. In this way, compared with an operation command in the current technology, the operation command in this application can carry more information. Based on this, when a plurality of EHS operation commands need to be executed, the UFS host controller may send the plurality of EHS operation commands to the UFS device controller through one operation command.

The UPIU frame header includes the total length field of the EHS. The total length field of the EHS indicates that the length of the EHS is not 0, and the EHS indicates storage addresses respectively corresponding to plurality of EHS operation commands. The plurality of EHS operation commands may indicate a plurality of read operations, a plurality of write operations, or a plurality of erase operations, that is, the plurality of EHS operation commands, which are all read operations, all write operations, or all erase operations, may be sent to the UFS device controller at a time through one operation command.

A maximum length of the EHS may be N KB−32 B, that is, the total length of the EHS is less than or equal to N KB−32 B. A specific value of the total length can be determined based on a length of data actually written into the EHS. A storage address corresponding to any one of the plurality of EHS operation commands may be represented in a manner of a head address with a data length. For example, a memory operation is a read operation, a head address corresponding to the read operation is a head address of to-be-read data in a storage area in the memory, and a data length is a length of to-be-read data starting from the head address.

Step 302: The UFS host controller sends the operation command to the UFS device controller.

The UFS host controller obtains the storage addresses respectively corresponding to the plurality of EHS operation commands. The operation commands sent to the UFS device controller may carry related information to indicate the storage addresses respectively corresponding to the plurality of EHS operation commands.

In a possible implementation, the UPIU frame header further includes a number of the plurality of EHS operation commands. The EHS includes head addresses and data lengths of logical block addresses (logical block addresses, LBAs) that are respectively corresponding to the plurality of EHS operation commands. That is, the EHS includes a plurality of LBAs, and each LBA corresponds to a data length.

In this embodiment, the storage addresses corresponding to the plurality of EHS operation commands are consecutive or inconsecutive. For example, a plurality of EHS operation commands indicate a plurality of read operations. Using a read operation 1, a read operation 2, and a read operation 3 as an example, the read operation 1 corresponds to an LBA 1 and a data length 1, the read operation 2 corresponds to an LBA 2 and a data length 2, and the read operation 3 corresponds to an LBA 3 and a data length 3. The LBA 1, the LBA 2, and the LBA 3 may be consecutive, that is, storage areas of data to be read by the read operation 1, the read operation 2, and the read operation 3 are adjacent in the memory. The LBA 1, the LBA 2, and the LBA 3 may be inconsecutive, that is, storage areas of data to be read by the read operation 1, the read operation 2, and the read operation 3 are not adjacent in the memory, and are separated from each other. It should be understood that, the LBAs respectively corresponding to the plurality of EHS operation commands may alternatively be that some LBAs are consecutive, and the other LBAs are inconsecutive.

Figure 4:
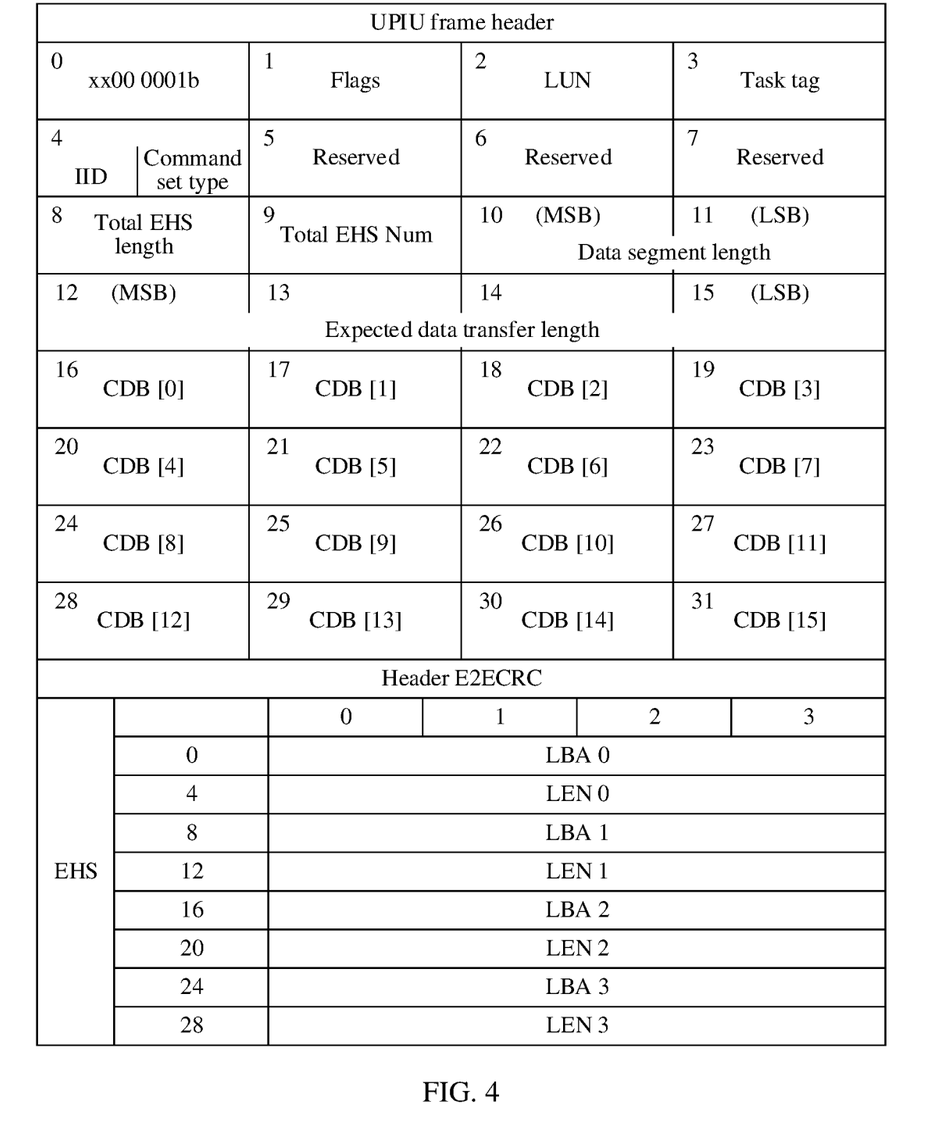
FIG. 4 is a diagram of a structure of an example of an operation command according to this application.

For example, FIG. 4 is a diagram of a structure of an example of an operation command according to this application. As shown in FIG. 4, the UPIU frame header in the operation command occupies bytes 0 to 31, a total of 32 B. A byte 8 is filled with an EHS length (Total EHS Length), for example, 32 B, and a byte 9 is filled with a number of the plurality of EHS operation commands (Total EHS Num), for example, 4.

The EHS in the operation command occupies 32 bytes. Bytes 0 to 3 are filled with LBA 0 of the first memory operation, and bytes 4 to 7 are filled with LEN 0 of the first memory operation. Bytes 8 to 11 are filled with LBA 1 of the second memory operation, and bytes 12 to 15 are filled with LEN 1 of the second memory operation. Bytes 16 to 19 are filled with LBA 2 of the third memory operation, and bytes 20 to 23 are filled with LEN 2 of the third memory operation. Bytes 24 to 27 are filled with LBA 3 of the fourth memory operation, and bytes 28 to 31 are filled with LEN 3 of the fourth memory operation. In this embodiment, a row number in the EHS represents an index number of the first byte in a group of every four bytes, and a column number represents an offset of an index number of each byte in the group of bytes relative to the index number of the first byte. It should be noted that the index number of the byte in the EHS may alternatively be represented in another manner. This is not specifically limited in this application.

In a possible implementation, the UPIU frame header further includes head logical block addresses and total data lengths that are corresponding to the plurality of EHS operation commands. The EHS includes physical page numbers (PPNs) respectively corresponding to the plurality of EHS operation commands.

In this embodiment, the storage addresses respectively corresponding to the plurality of EHS operation commands are consecutive, and a head address of the PPNs corresponding to the plurality of EHS operation commands correspond to head addresses of the LBAs corresponding to the plurality of EHS operation commands. Based on this, only the head addresses of the LBAs corresponding to the plurality of EHS operation commands may be filled in the UPIU frame header. In this way, the LBA with the total data lengths corresponding to the plurality of EHS operation commands may indicate storage areas of all data to be processed by the plurality of EHS operation commands in the memory. In addition, only when a read operation is performed, the UFS host controller can obtain a correspondence between the LBA and the PPN. This is because the data is already stored in the memory, and a storage position of the data is determined, and therefore the correspondence between the LBA and the PPN can be established.

Figure 5:
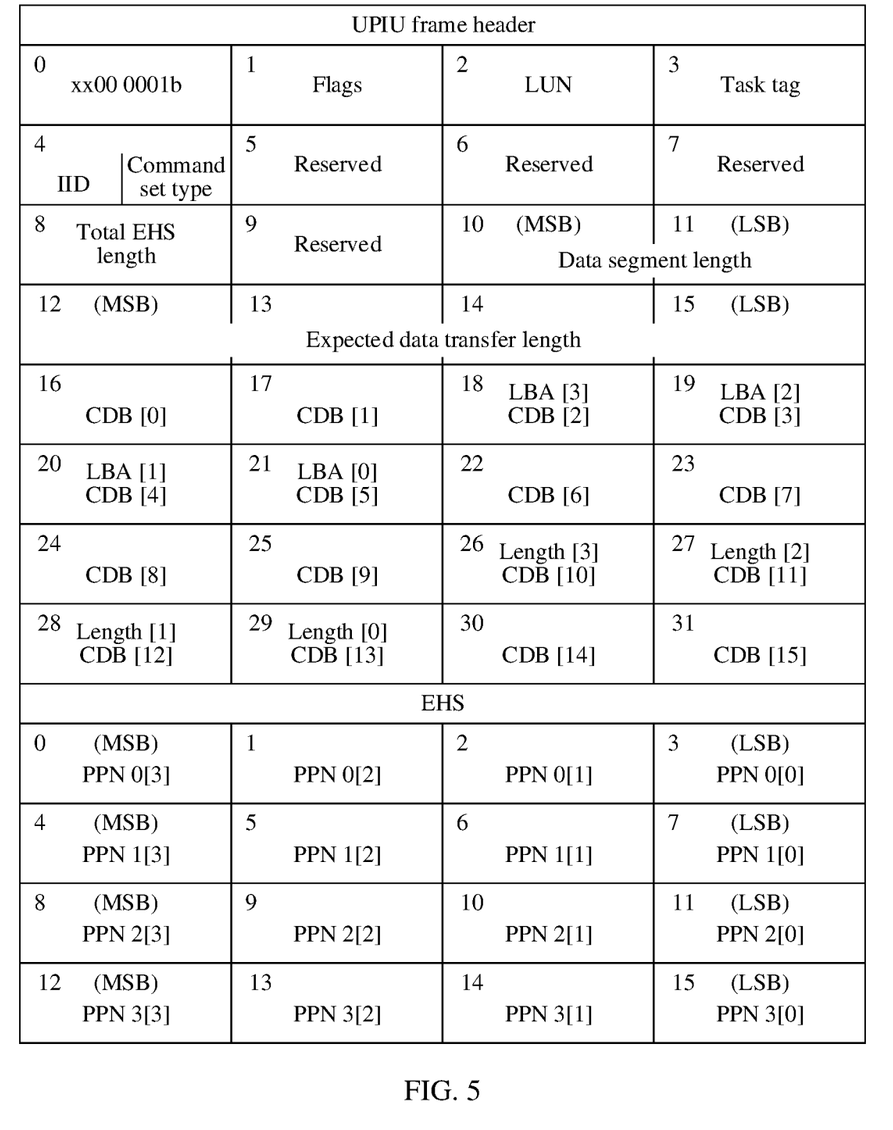
FIG. 5 is a diagram of a structure of an example of an operation command according to this application.

For example, FIG. 5 is a diagram of a structure of an example of an operation command according to this application. As shown in FIG. 5, the UPIU frame header in the operation command occupies bytes 0 to 31, a total of 32 B. A byte 8 is filled with a total length of the EHS (Total EHS Length), for example, 32 B. Bytes 18 to 21 are filled with the head logical block addresses (LBA [3] to LBA [0]) corresponding to the plurality of read operations. Bytes 26 to 29 are filled with the total data lengths (Length [3] to Length [0]) corresponding to the plurality of read operations.

The EHS in the operation command occupies 32 bytes. Bytes 0 to 3 are filled with a PPN 0 (PPN 0[3] to PPN 0[0]) of the first read operation. Bytes 4 to 7 are filled with a PPN 1 (PPN 1[3] to PPN 1[0]) of the second read operation. Bytes 8 to 11 are filled with a PPN 2 (PPN 2[3] to PPN 2[0]) of the third read operation. Bytes 12 to 15 are filled with a PPN 3 (PPN 3[3] to PPN 3[0]) of the fourth read operation.

Figure 6:
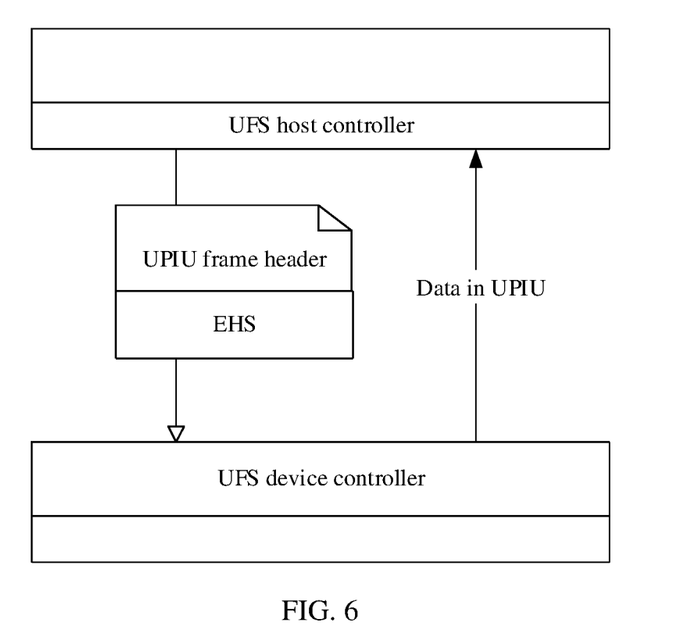
FIG. 6 is a flowchart of an example of a read operation execution method according to this application.

FIG. 6 is a flowchart of an example of a read operation execution method according to this application. As shown in FIG. 6, the UFS host controller sends a read operation command to the UFS device controller. The read operation command includes a UPIU frame header and an EHS, and the EHS includes addresses of data to be read by a plurality of read operations in storage areas of the memory. After obtaining the stored data from the addresses, the UFS device controller returns the data to the UFS host controller by using a Data In UPIU command, and the entire read operation is completed. It can be learned that compared with the procedure shown in FIG. 1, in the method in this application, only one operation command is required to request to read data of a plurality of addresses, and command interactions are reduced. In addition, because the UFS host controller and the UFS device controller can support a larger amount of data to be transmitted, when the UFS device controller returns data again, more data may be carried in one command. Therefore, return commands are also reduced, and overall command overheads are reduced.

Step 303: The UFS device controller determines, based on the operation command, storage addresses respectively corresponding to the plurality of EHS operation commands.

After receiving the operation command, the UFS device controller can extract information from corresponding bytes based on a format of the operation command, including the number of the plurality of EHS operation commands, the total length of the EHS, and the storage addresses and the data lengths respectively corresponding to the plurality of EHS operation commands.

In a possible implementation, according to the structure shown in FIG. 4, the UFS device controller extracts the length of the EHS from the byte 8 in the UPIU frame header, and extracts the number of the plurality of EHS operation commands from the byte 9. The LBA 0 of the first memory operation is extracted from the bytes 0 to 3 in the EHS, and the LEN 0 of the first memory operation is extracted from the bytes 4 to 7. The LBA 1 of the second memory operation is extracted from the bytes 8 to 11, and the LEN 1 of the second memory operation is extracted from the bytes 12 to 15. The LBA 2 of the third memory operation is extracted from the bytes 16 to 19, and the LEN 2 of the third memory operation is extracted from the bytes 20 to 23. The LBA 3 of the fourth memory operation is extracted from the bytes 24 to 27, and the LEN 3 of the fourth memory operation is extracted from the bytes 28 to 31.

In a possible implementation, according to the structure shown in FIG. 5, the UFS device controller extracts the EHS length from the byte 8 in the UPIU frame header, extracts the head LBA (LBA [3] to LBA [0]) corresponding to the plurality of read operations from the bytes 18 to 21, and extracts total data lengths (Length [3] to Length [0]) corresponding to the plurality of read operations from the bytes 26 to 29. The PPN 0 (PPN 0[3] to PPN 0[0]) of the first read operation is extracted from the bytes 0 to 3 in the EHS. The PPN 1 (PPN 1[3] to PPN 1[0]) of the second read operation is extracted from the bytes 4 to 7. The PPN 2 (PPN 2[3] to PPN 2[0]) of the third read operation is extracted from the bytes 8 to 11. The PPN 3 (PPN 3[3] to PPN 3[0]) of the fourth read operation is extracted from the bytes 12 to 15.

Based on the foregoing information, the UFS device controller can determine a storage area of data to be processed by each memory operation in the memory.

Step 304: The UFS device controller performs corresponding memory operations at the storage addresses respectively corresponding to the plurality of EHS operation commands.

The UFS device controller performs a corresponding operation on a plurality of storage areas determined in the foregoing steps, based on an operation type indicated in an operation instruction, for example, a read operation, a write operation, or an erase operation. When the memory operation is the read operation, the UFS device controller obtains stored data from a plurality of indicated storage areas. When the memory operation is the write operation, the UFS device controller writes data sent by the UFS host controller in the plurality of indicated storage areas. When the memory operation is the erase operation, the UFS device controller erases data from the plurality of indicated storage areas.

Step 305: The UFS device controller returns a processing result to the UFS host controller.

When the memory operation is the read operation, the UFS device controller returns read data to the UFS host controller. When the memory operation is the write operation, the UFS device controller returns a write success response to the UFS host controller. When the memory operation is the erase operation, the UFS device controller returns an erase success response to the UFS host controller.

It should be noted that, in addition to the foregoing fields, the operation command in this application may also include other fields. For example, the UPIU frame header also includes an index field (xx00 0001b) and a flag field (Flag) of the operation command. These fields may follow related stipulations in a protocol. This is not specifically limited in this application.

In this application, based on an extended operation command, one operation command can carry the storage addresses and the data lengths respectively corresponding to the plurality of EHS operation commands, and only a few command interactions are required to request to perform memory operations for a plurality of addresses, thereby reducing command interactions. In addition, because the UFS host controller and the UFS device controller can support a larger amount of data to be transmitted, when the UFS device controller receives or returns data again, more data may be carried in one command. Therefore, return commands are also reduced, and overall command overheads are reduced. During performing of a memory operation, each command needs to be scheduled by a block layer (Block), and transmitted by a driver layer (Driver) and a physical layer. After the method in this application is used, IO aggregation can be implemented for a plurality of EHS operation commands, and corresponding processing such as scheduling and transmission can be combined, thereby further reducing a processing procedure of a memory operation and improving memory operation efficiency.

Figure 7:
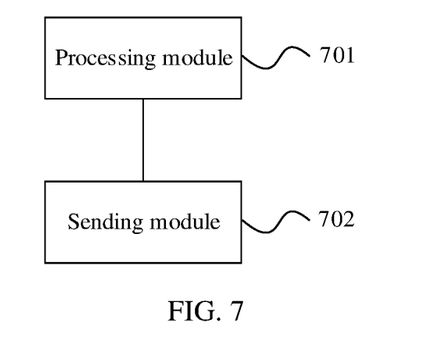
FIG. 7 is a schematic diagram of a structure of an example of a UFS host control apparatus according to this application.

FIG. 7 is a schematic diagram of a structure of an example of a UFS host control apparatus according to this application. As shown in FIG. 7, the apparatus in this embodiment may be the UFS host controller in the foregoing embodiments. The apparatus includes a processing module 701 and a sending module 702.

The processing module 701 is configured to generate an operation command, and the operation command includes a universal flash storage protocol information unit UPIU frame header and an extension header segment EHS. The UPIU frame header includes a total length field of the EHS, the total length field of the EHS indicates that a length of the EHS is not 0, and the EHS indicates storage addresses respectively corresponding to a plurality of EHS operation commands. The sending module 702 is configured to send the operation command to a universal flash storage UFS device controller.

In a possible implementation, the UPIU frame header includes a number of the plurality of EHS operation commands.

In a possible implementation, the UPIU frame header includes head logical block addresses and total data lengths that are corresponding to the plurality of EHS operation commands.

In a possible implementation, the plurality of EHS operation commands indicate a plurality of read operations, a plurality of write operations, or a plurality of erase operations. The storage addresses respectively corresponding to the plurality of EHS operation commands are consecutive or inconsecutive.

In a possible implementation, the EHS includes head logical block addresses and data lengths that are respectively corresponding to the plurality of EHS operation commands.

In a possible implementation, the plurality of EHS operation commands indicate a plurality of read operation, and the storage addresses respectively corresponding to the plurality of EHS operation commands are consecutive.

In a possible implementation, the EHS includes physical page numbers respectively corresponding to the plurality of EHS operation commands.

The apparatus in this embodiment may be configured to perform the technical solution of the method embodiment shown in FIG. 3, an implementation principle and a technical effect are similar, and details are not described herein again.

Figure 8:
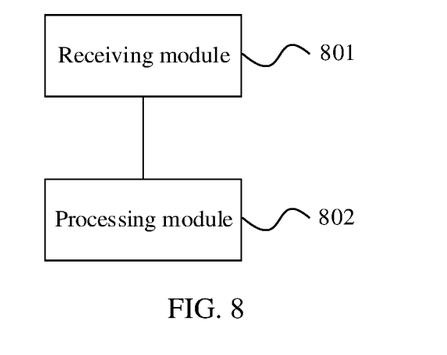
FIG. 8 is a schematic diagram of a structure of an example of a UFS device control apparatus according to this application.

FIG. 8 is a schematic diagram of a structure of an example of a UFS device control apparatus according to this application. As shown in FIG. 8, the apparatus in this embodiment may be the UFS device controller in the foregoing embodiments. The apparatus includes a receiving module 801 and a processing module 802.

The receiving module 801 is configured to receive an operation command from a universal flash storage UFS host controller, and the operation command includes a universal flash storage protocol information unit UPIU frame header and an extension header segment EHS. The UPIU frame header includes a total length field of the EHS, the total length field of the EHS indicates that a length of the EHS is not 0, and the EHS indicates storage addresses respectively corresponding to a plurality of EHS operation commands.

The processing module 802 is configured to determine, based on the operation command, the storage addresses respectively corresponding to the plurality of EHS operation commands, and perform corresponding memory operation on storage media at the storage addresses respectively corresponding to the plurality of EHS operation commands.

In a possible implementation, the UPIU frame header includes a number of the plurality of EHS operation commands.

In a possible implementation, the UPIU frame header includes head logical block addresses and total data lengths that are corresponding to the plurality of EHS operation commands.

In a possible implementation, the plurality of EHS operation commands indicate a plurality of read operations, a plurality of write operations, or a plurality of erase operations. The storage addresses respectively corresponding to the plurality of EHS operation commands are consecutive or inconsecutive.

In a possible implementation, the EHS includes head logical block addresses and data lengths that are respectively corresponding to the plurality of EHS operation commands.

In a possible implementation, the plurality of EHS operation commands indicate a plurality of read operations, and the storage addresses respectively corresponding to the plurality of EHS operation commands are consecutive.

In a possible implementation, the EHS includes physical page numbers respectively corresponding to the plurality of EHS operation commands.

The apparatus in this embodiment may be configured to perform the technical solution of the method embodiment shown in FIG. 3, an implementation principle and a technical effect are similar, and details are not described herein again.

In an implementation process, steps in the foregoing method embodiments can be implemented by using a hardware integrated logical circuit in a processor, or by using instructions in a form of software. The processor may be a general-purpose processor, a digital signal processor (DSP), an application-specific integrated circuit (ASIC), a field-programmable gate array (FPGA) or another programmable logic device, a discrete gate or transistor logic device, or a discrete hardware component. The general-purpose processor may be a microprocessor, or the processor may be any conventional processor or the like. The steps of the methods disclosed in embodiments of this application may be directly presented as being performed and completed by a hardware encoding processor, or performed and completed by a combination of hardware and a software module in an encoding processor. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

The memory in the foregoing embodiments may be a volatile memory or a non-volatile memory, or may include both a volatile memory and a non-volatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist independently physically, or two or more units may be integrated into one unit.

When the functions are implemented in the form of a software functional unit and sold or used as an independent product, the functions may be stored in a computer-readable storage medium. Based on such an understanding, the technical solutions in this application essentially, or the part contributing to the conventional technology, or a part of the technical solutions may be implemented in a form of a software product. The computer software product is stored in a storage medium and includes several instructions for instructing a computer device (a personal computer, a server, a network device, or the like) to perform all or a part of the steps of the methods in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
generating an operation command, wherein the operation command comprises a universal flash storage protocol information unit (UPIU) frame header and an extension header segment (EHS), wherein the UPIU frame header comprises a total length field carrying a length of the EHS, the total length field of the EHS indicates that the length of the EHS is not 0, the EHS indicates storage addresses respectively corresponding to a plurality of EHS operation commands, the UPIU frame header further comprises a total quantity field carrying a quantity of commands in the plurality of EHS operation commands, and the total length field and the total quantity field are different fields; and
sending the operation command to a universal flash storage (UFS) device controller.

2. The method according to claim 1, wherein the UPIU frame header further comprises head logical block addresses and total data lengths that correspond to the plurality of EHS operation commands.

3. The method according to claim 1, wherein the plurality of EHS operation commands indicate a plurality of read operations, a plurality of write operations, or a plurality of erase operations, and wherein the storage addresses respectively corresponding to the plurality of EHS operation commands are consecutive storage addresses or inconsecutive storage addresses.

4. The method according to claim 3, wherein the EHS comprises head logical block addresses and data lengths that are respectively corresponding to the plurality of EHS operation commands.

5. The method according to claim 1, wherein the plurality of EHS operation commands indicate a plurality of read operations, and the storage addresses respectively corresponding to the plurality of EHS operation commands are consecutive storage addresses.

6. The method according to claim 5, wherein the EHS comprises physical page numbers respectively corresponding to the plurality of EHS operation commands.

7. The method of claim 1, the total length field and the total quantity field are adjacent to each other.

8. The method of claim 1, wherein a total length of the operation command is N KB, and the length of the EHS carried in the total length field is N KB−32 B, N being an integer greater than 4.

9. A method, comprising:
receiving an operation command from a universal flash storage (UFS) host controller, wherein the operation command comprises a universal flash storage protocol information unit (UPIU) frame header and an extension header segment (EHS), wherein the UPIU frame header comprises a total length field carrying a length of the EHS, the total length field indicates that the length of the EHS is not 0, the EHS indicates storage addresses respectively corresponding to a plurality of EHS operation commands, the UPIU frame header further comprises a total quantity field carrying a quantity of commands in the plurality of EHS operation commands, and the total length field and the total quantity field are different fields;
determining, based on the operation command, the storage addresses respectively corresponding to the plurality of EHS operation commands; and
performing corresponding memory operations at the storage addresses respectively corresponding to the plurality of EHS operation commands.

10. The method according to claim 9, wherein the UPIU frame header further comprises head logical block addresses and total data lengths that correspond to the plurality of EHS operation commands.

11. The method according to claim 9, wherein the plurality of EHS operation commands indicate a plurality of read operations, a plurality of write operations, or a plurality of erase operations, and wherein the storage addresses respectively corresponding to the plurality of EHS operation commands are consecutive storage addresses or inconsecutive storage addresses.

12. The method according to claim 11, wherein the EHS comprises head logical block addresses and data lengths that respectively correspond to the plurality of EHS operation commands.

13. The method according to claim 9, wherein the plurality of EHS operation commands indicate a plurality of read operations; and the storage addresses respectively correspond to the plurality of EHS operation commands are consecutive storage addresses.

14. The method according to claim 13, wherein the EHS comprises physical page numbers respectively corresponding to the plurality of EHS operation commands.

15. A universal flash storage (UFS) host controller, comprising:
a processor; and
an interface circuit;
wherein the processor is configured to generate an operation command, wherein the operation command comprises a universal flash storage protocol information unit (UPIU) frame header and an extension header segment (EHS), wherein the UPIU frame header comprises a total length field carrying a length of the EHS, the total length field indicates that the length of the EHS is not 0, the EHS indicates storage addresses respectively corresponding to a plurality of EHS operation commands, the UPIU frame header further comprises a total quantity field carrying a quantity of commands in the plurality of EHS operation commands, and the total length field and the total quantity field are different fields; and
wherein the interface circuit is configured to send the operation command to a UFS device controller.

16. The UFS host controller according to claim 15, wherein the UPIU frame header further comprises head logical block addresses and total data lengths that correspond to the plurality of EHS operation commands.

17. The UFS host controller according to claim 15, wherein the plurality of EHS operation commands indicate a plurality of read operations, a plurality of write operations, or a plurality of erase operations, and wherein the storage addresses respectively corresponding to the plurality of EHS operation commands are consecutive storage addresses or inconsecutive storage addresses.

18. The controller according to claim 17, wherein the EHS comprises head logical block addresses and data lengths that respectively correspond to the plurality of EHS operation commands.

19. The UFS host controller according to claim 15, wherein the plurality of EHS operation commands indicate a plurality of read operations; and the storage addresses respectively corresponding to the plurality of EHS operation commands are consecutive storage addresses.

20. The UFS host controller according to claim 19, wherein the EHS comprises physical page numbers respectively corresponding to the plurality of EHS operation commands.

21. A universal flash storage (UFS) device, comprising:
a processor;
an interface circuit; and
a storage medium;
wherein the interface circuit is configured to receive an operation command from a UFS host controller, wherein the operation command comprises a universal flash storage protocol information unit (UPIU) frame header and an extension header segment (EHS), wherein the UPIU frame header comprises a total length field carrying a length of the EHS, the total length field indicates that the length of the EHS is not 0, the EHS indicates storage addresses respectively corresponding to a plurality of EHS operation commands, the UPIU frame header further comprises a total quantity field carrying a quantity of commands in the plurality of EHS operation commands, and the total length field and the total quantity field are different fields; and
wherein the processor is configured to:
determine, based on the operation command, the storage addresses respectively corresponding to the plurality of EHS operation commands; and
perform corresponding memory operations on the storage medium at the storage addresses respectively corresponding to the plurality of EHS operation commands.

22. The device according to claim 21, wherein the UPIU frame header further comprises head logical block addresses and total data lengths that correspond to the plurality of EHS operation commands.

23. The device according to claim 21, wherein the plurality of EHS operation commands indicate a plurality of read operations, a plurality of write operations, or a plurality of erase operations, and wherein the storage addresses respectively corresponding to the plurality of EHS operation commands are consecutive storage addresses or inconsecutive storage addresses.

24. The device according to claim 23, wherein the EHS comprises head logical block addresses and data lengths that are respectively corresponding to the plurality of EHS operation commands.

* * * * *